United States Patent [19]
Lazzari

[11] 3,975,771
[45] Aug. 17, 1976

[54] MAGNETIC HEAD DEVICES ENCLOSED BY A SHIELD HAVING SUPERPOSED LAYERS AND AN INTERVENING LAYER OF SOLDER

[75] Inventor: Jean-Pierre Lazzari, Villiers Saint Frederic, France

[73] Assignee: Compagnie Internationale pour l'Informatique, Louveciennes, France

[22] Filed: Feb. 21, 1974

[21] Appl. No.: 444,495

[30] Foreign Application Priority Data
Feb. 21, 1973   France ............................ 73.06006

[52] U.S. Cl. .............................. 360/104; 360/103; 360/122; 360/124; 360/129
[51] Int. Cl.² ..................... G11B 5/11; G11B 5/22; G11B 5/48
[58] Field of Search ........... 360/104, 102, 103, 125, 360/124, 128, 129, 119–123

[56] References Cited
UNITED STATES PATENTS

| | | | |
|---|---|---|---|
| 2,846,517 | 8/1958 | Farrand et al. | 360/125 |
| 3,234,338 | 2/1966 | Foster et al. | 360/129 |
| 3,562,444 | 2/1971 | Hoogendorn et al. | 360/103 |
| 3,678,211 | 7/1972 | Hoogendorn et al. | 360/103 |

OTHER PUBLICATIONS
IBM Technical Disclosure Bulletin, *Shielding Method*, D. W. Brede et al., vol. 12, No. 7, Dec. 1969, p. 958.
W. D. Kehr et al., Making Electromagnetic Shields Including Ferrite, IBM Technical Disclosure Bulletin, vol. 15, No. 8 Jan. 1973, p. 2508.

*Primary Examiner*—Alfred H. Eddleman
*Attorney, Agent, or Firm*—Kemon, Palmer & Estabrook

[57] ABSTRACT

In magnetic disk equipments or the like, the read/write magnetic heads are each bonded to the wall of a thru-hole of a carrier plate adapted to act as a "flying" member maintained by an aerodynamical action in close proximity to the surface of the rotating disk. In a device according to the invention, the bond between the lateral surface of the head and said wall is made to ensure magnetostatic and electrostatic shielding of the head against spurious magnetic, electromagnetic and electrostatic fields. Said bond may comprise thin films of a high permeability anisotropic material coating at least the facing surfaces of the head and the wall and a layer of solder intervening between said films. Such a shield may partially extend over selected areas of the rear faces of the plate and head.

9 Claims, 7 Drawing Figures

MAGNETIC HEAD DEVICES ENCLOSED BY A SHIELD HAVING SUPERPOSED LAYERS AND AN INTERVENING LAYER OF SOLDER

BRIEF SUMMARY OF THE INVENTION

In magnetic disk equipments or the like, the read/-write magnetic heads must "fly" in close proximity to the surface of the rotating member and for this purpose, it is conventional to mount such heads within thru-holes of carrier plates which are adapted to so fly as being maintained at a few microns distance from the surface of the member by the well-known aerodynamical effect. Up to now, the bonding of the lateral surface of the head to the wall of the hole has been provided either by glueing the facing surfaces with an appropriate resin or by soldering the facing surfaces with an appropriate glass.

The carrier plates are usually made of a non-magnetic and insulating material, for instance alumina, glass or ceramics. Usually too, the rear portion of the head, opposite to its airgap face, protrudes from the plate and is shielded against the action of external spurious fields by application of a cup-shaped high permeability shield secured over said rear portion of the head. This shield is nevertheless incapable of shielding the airgap portion of the head which is quite responsive to the damaging action of such fields.

It is an object of the invention to provide a structure of the bond and a method of making same which ensure both a firm bonding action and an efficient shielding action for the magnetic head.

Further, when considering magnetic heads of the so-called integrated type, the glass soldering method was not practically feasible because such heads are usually protected by a glassy encapsulation so that such a unit cannot be used at temperatures higher than about 250°C. On the other hand, the suitable bonding glasses to be used for bonding magnetic heads to the above recited insulating non magnetic materials without undue development of strains are glass compositions the melting temperature of which largely exceeds 300°C.

It is a further object of the invention to so provide the structure of the shielding bond and the method of making it which do not necessitate application of heat at higher temperatures than 250°C.

SHORT DESCRIPTION OF THE DRAWINGS

The invention will be described in full detail with reference to the accompanying drawings which illustrate the mounting of magnetic heads of the said integrated type on carrier plates adapted for use in magnetic disk equipments or the like. Any alternative application of the invention will be directly deduceable from the illustrative embodiment shown in the drawings:

FIG. 1 shows a perspective view, partially in section, of a preferred embodiment, FIG. 2 shows a perspective view of an integrated magnetic head structure in accordance with the invention, FIG. 3 shows an enlarged partial cross-section view of the embodiment, of FIG. 1, FIGS. 4 to 6, inclusive, show partial views of mounting aids for a preferred application of the method according to the invention from which the embodiment of FIGS. 1 to 3 is obtained, and, FIG. 7 shows how the structure of the bond according to the invention actually shields the whole height of the head in such an embodiment as in FIGS. 1 to 3.

DETAILED DESCRIPTION

Figure 2:
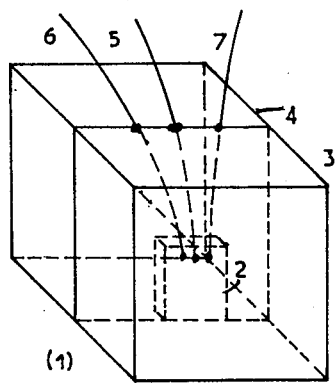

The integrated magnetic head structure of FIG. 2 actually comprises such an integrated head proper 2 encapsulated between two glass blades 3 and 4 which are in a glass material having a relatively low melting point, not over 250°C. Such structure will be hereinafter referred to as the "head" for short. The integrated head proper comprises as usual a flat spiral coil part of which is located within two ferromagnetic layers defining an airgap at one end face of the head. Said end face, and consequently said airgap is level with the bottom surface of the structure of FIG. 2. Conducting wires are shown at 5, 6 and 7 and extend outside the glass encapsulation.

The head must be mounted on a carrier plate, or "shoe", 10 which is made of a dielectric non-magnetic material as conventional per se.

Figure 7:
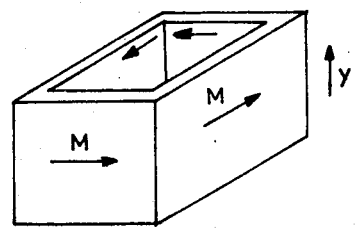

According to the invention, the wall of the hole of the plate 10 which will receive the magnetic head is coated with a film 8 of an anisotropic material of a high magnetic permeability. The thickness of said film may be of the order of 5 microns. Such a magnetic material may be permalloy or the like. A similar magnetic film is coated at 9 over the surface of the head which will register the wall once the head is mounted on the plate. The height of the film 9 may be preferably slightly higher than the depth of the hole. As shown in FIG. 7, each one of the magnetic films 8 and 9 defines a rectangular cross-section magnetic member in which the magnetization vector M can only be orientated along the direction of closure of the magnetic flux, corresponding to the minimal value of the magnetostatic energy.

A film of low temperature metallic soldering material 11 coats the magnetic film 9 and an identical film of soldering material coats the magnetic film 8, as shown at 12. The soldering material may illustratively be indium, tin or any metallic mixture constituting a brazing material having a melting point lower than 250°C. and incapable of diffusing within the material of the layers 8 and 9.

The next step consists of the introduction of the head provided with its two films 9 and 11 within the hole of the plate provided with the two films 8 and 12. The cross-section of the thru-hole is such as to leave a small spacing between the films 11 and 12. Illustratively, the thickness of each of said films 11 and 12 may be of the same order of value as the films 8 and 9. A string of a soldering material, preferably identical to the material of the films 11 and 12 is for instance placed around the part of the magnetic head which protrudes from the hole. Such a string is not shown for the sake of simplicity. The whole composite structure is temporarily heated to the melting temperature of the soldering material. As the head is supported by any suitable means with its airgap face level with the lower face of the plate 10 and suitably centered too within the hole, the soldering material of the string, when melted, enters the space between the then melted films of soldering material 11 and 12 so that an efficient bonding layer is formed at 13 and in the final state of the device, after the heat is cancelled, a very tightbond is formed between the head and the wall. Of course, the layer 13 and the films 11 and 12 are practically indistinguishable in this final bond. Said films 11 and 12 however greatly facilitate the formation of the bond.

In order to perfect the shielding of the head which is ensured at the level of the plate by the composite bond, the magnetic layer 8, when formed, is extended as shown at 14 over a part of the rear surface of the plate which surrounds the thru-hole. A solder layer 15 is also formed as an extension of the solder film 12, over the layer 14. The width of the layer 14 is a function of the thickness of the carrier plate and, for instance, not lower than the said thickness.

The shield acts as a magnetostatic one because the high permeability layers 8–14 and 9 divert external spurious magnetic fields. Further the electromagnetic radiations are absorbed by the soldering material films which have a low resistivity. The film 9 further acts as a layer enabling a strong bond between the glass blades 3 and 4 of the head and the solder layer 11.

Figure 3:
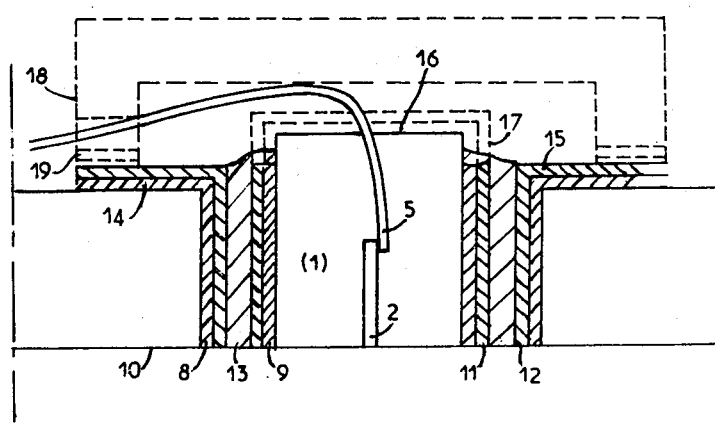

The surface of the head 16 on the rear of the assembly is deprived of any shield protection. As, in an integrated head structure, see FIG. 2, the head 2 proper is distant from the surface 16, it may be estimated that shielding the surface is useless. When desired, however, such a shield protection may be obtained as indicated in interrupted lines in FIG. 3: either a shielding cup 18 may be brazed or soldered over the portion 14/15 of the shield arrangement which has been already described; or the layers 9 and 11 (at least the layer 9) may be extended at 17 on the rear surface of the head. In the first possibility, the edge of the cup 18, made for instance of a ferrite material, may advantageously be coated with a layer of solder 19 for facilitating the application and bonding of the cup over the layers 14/15, and, of course, the cup is provided with passages for the conductors 5, 6 and 7. In the second possibility, the said conductors must be protected against the deposition of the magnetic and solder materials over the surface 16.

Figure 1:
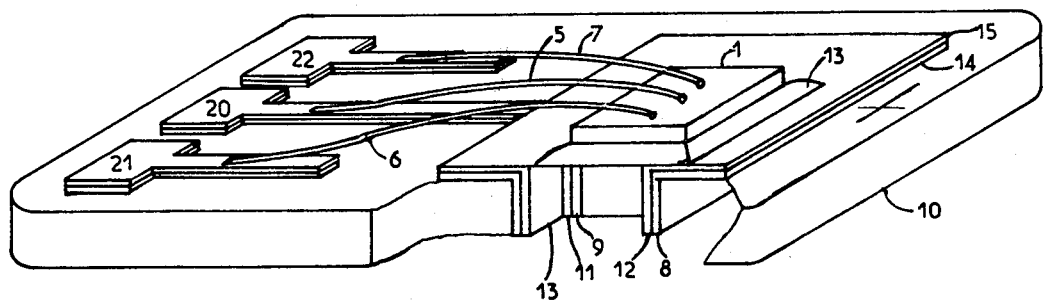

The magnetic film and the solder film may be further used for providing three electric terminal members 20, 21 and 22 on the rear face of the carrier plate, FIG. 1. The connection wires 5 to 7 will have their ends brazed or soldered to these terminals which will be further used for the establishment of connections to the external circuits assuming conventional functions such as amplification of the signals read out from the head or application of the write-in signals to the head. Such circuits may be remote and only their leads connected to the terminals, or they may consist, as known, of monolithic integrated circuits directly applied over the terminals and carried by the carrier plate 10. The terminal 20 is specially provided for application of the ground and, in this respect, said terminal 20 is made integral with the films 14-15 so that any electrical charges which may appear on the shield will be channelled to ground.

Figure 4:
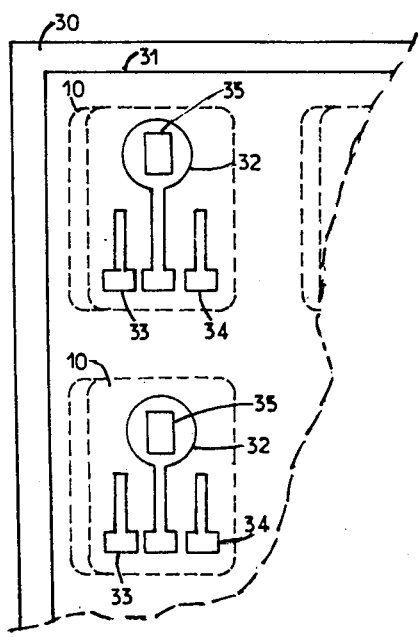
Figure 5:
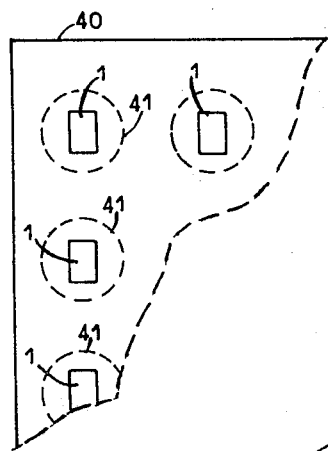
Figure 6:
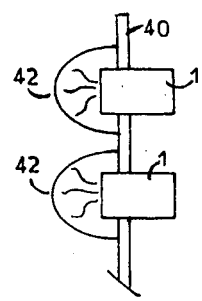

Though the practice of the invention is not dependent on any method of deposition of the films, it is thought of advantage to ensure this desposition from the well known cathodic deposition or sputtering process, application of said process being further provided as follows, refer to FIGS. 4 to 6.

The carrier plates 10, machined with their thru-holes at 35, are mounted between a pair of metallic plates 30 and 31. The front plate 31 is perforated as shown at 32, 33 and 34 in accordance with the pattern of the metallizations to be made on the rear face of the carrier plates 10. Similarly, the heads 1 are mounted on a metallic plate 40 and temporarily affixed to this plate by means, for instance, of a soluble resin 42 wherein the wires 5, 6 and 7 are embedded. The trace of 42 is shown at 41 on FIG. 5. The heads 1 have their front parts protruding from the plates as shown in said FIG. 6.

Such assemblies are placed within a conventional vacuum vessel, not shown as being conventional, facing a cathode sputtering electrode arrangement therein.

The vessel is evacuated and the first sputtering operation is made with the appropriate magnetic material, as conventional. This operation results in the generation of the films 9 on the heads 1 and of the films 8–14 and 20–21–22. The front faces of the heads 1 may be coated with a mask for this operation though this is not imperative as will be hereinbelow explained. Thereafter and without breaking the vacuum, the second sputtering operation is made with the appropriate solder material, as conventional too. This second operation coats the films of solder over the films of magnetic material. The vessel is opened, the assemblies withdrawn and the carrier plates and the heads are removed from the metallic plates 30, 31 and 40. The remaining steps of assembly and bonding of the carrier plates and heads are obvious from the further description given herein above.

After the heads have been bonded to the plates, it is usual to proceed with an abrasion of the face of the members so that the airgap surface of any member be perfectly planar. When no protection had been provided during the formation of the magnetic and solder films for avoiding the deposition of the films over the airgap faces of the heads, such an abrasion will remove these excedentary films.

When such layers as 16 and 17 are required, an intermediate step is provided consisting of removing the head temporary assemblies from the vacuum vessel, dissolving the resin 42, securing the already coated parts of the heads to the metallic plate 40 with the same resin, and proceeding with a further sputtering step, or steps, with the exposed rear faces of the heads facing the sputtering electrode system in the vessel. Another possibility is to force the heads through holes of the plate 40 without any resin at the first step of operation and providing two opposite sputtering electrode systems in the vessel so as to simultaneously obtain the films on both sides of the plate 40.

Conventional heads may be used as well as integrated heads provided a dielectric coating is previously formed over such conventional heads for insulating the magnetic pieces thereof.

What is claimed is:

1. The combination of:
   a magnetic head enclosed in dielectric material,
   a dielectric carrier plate provided with a thru-hole in which said head is placed with its airgap face level with the front face of the carrier plate,
   a bonding arrangement of said head within said hole comprising a first thin film of a high permeability anisotropic material bonded to the wall of the hole, a second film of the same high permeability anisotropic material bonded to the surface of the head within said hole and an intervening layer of solder bonding together the two magnetic films.

2. Combination according to claim 1, wherein a part of the rear face of the carrier plate which surrounds said hole is coated with the said first and the said solder films.

3. Combination according to claim 2, wherein discrete areas of the rear surface of the carrier plate are coated with a film of a high permeability anisotropic material and a film of solder material, the films of one of the said discrete areas being in continuity with the magnetic and solder films coating the said part of the rear face.

4. Combination according to claim 2, wherein a magnetostatic shield cup is soldered over the solder layer surrounding the thru-hole.

5. Combination according to claim 2, wherein the rear surface of the magnetic head is coated with a film of a high permeability anisotropic magnetic material and a film of solder material.

6. The combination of a magnetic head enclosed in dielectric material and a dielectric carrier plate provided with a through hole in which said head is located with its air gap face level with a face of said carrier plate and of a magnetostatic and electrostatic shield which functions as a bond between the facing surfaces of said head and said hole, said bond comprising a layer of high permeability anisotropic magnetic material on each said head and said plate, said layers connected by an intervening layer of metallic solder.

7. Combination according to claim 6, wherein the said magnetostatic and electrostatic shield bond is extended over a hole surrounding surface of the rear face of the carrier plate.

8. Combination according to claim 7, wherein the said magnetostatic and electrostatic shield bond is extended over the rear surface of the head.

9. Combination according to claim 7, wherein a magnetostatic shield cup is soldered over the extension of the magnetostatic and electrostatic shield bond.

* * * * *